Nov. 8, 1927. 1,648,801
W. A. FRITZ ET AL
METHOD OF REPAIRING METAL BEAMS
Filed Feb. 6, 1926 2 Sheets-Sheet 2
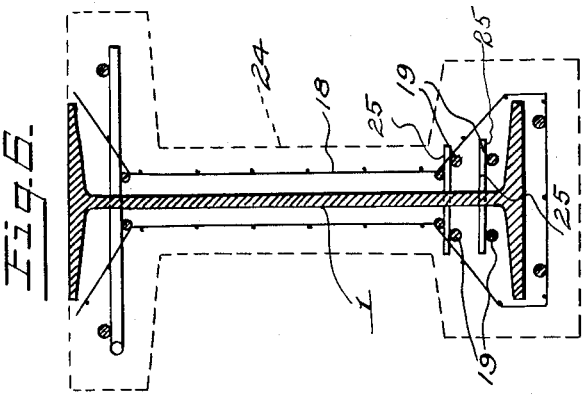
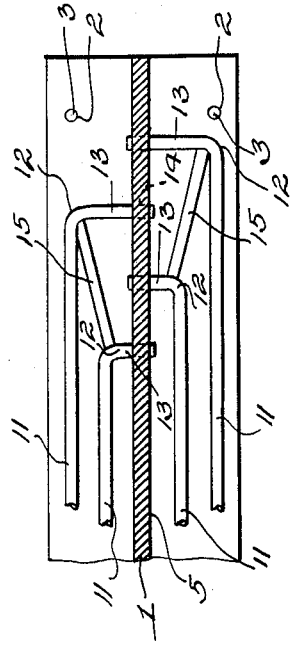
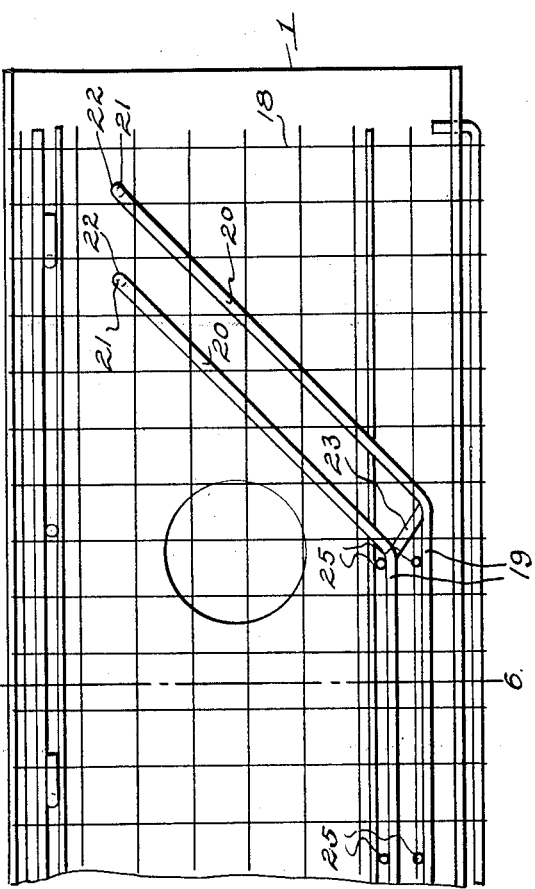
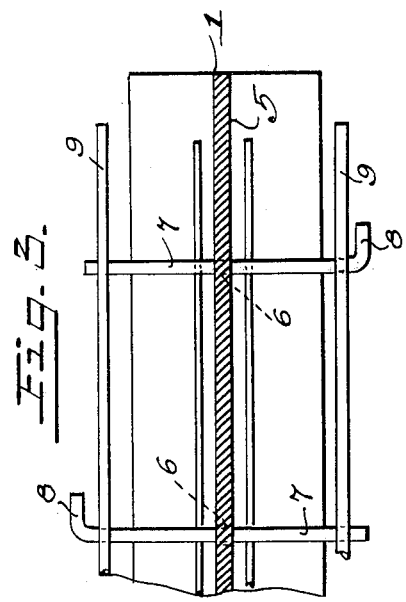
Inventors
W. A. Fritz
C. C. Cooke
Attorney Patented Nov. 8, 1927.

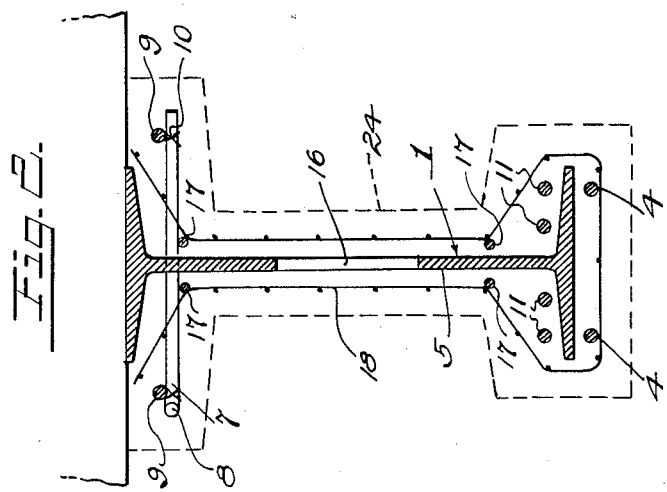
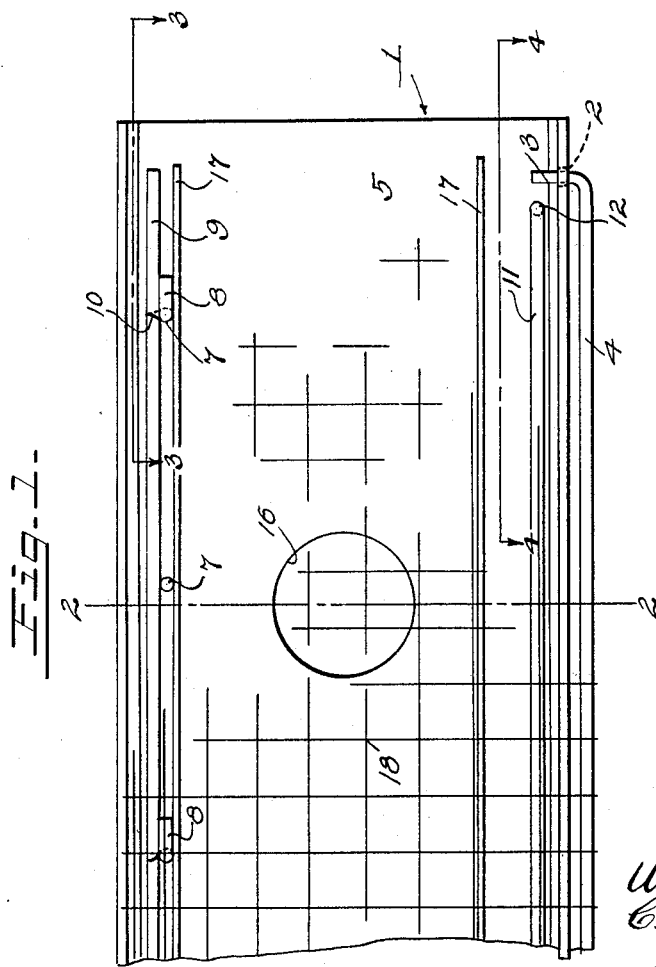

1,648,801

UNITED STATES PATENT OFFICE.

WILLIAM A. FRITZ AND CARL C. COOKE, OF COLUMBUS, OHIO.

METHOD OF REPAIRING METAL BEAMS.

Application filed February 6, 1926. Serial No. 86,392.

The present invention relates to a method of repairing metallic beams while in their original positions upon a bridge or like structure, but is not necessarily limited to such use.

Metal beams used in connection with bridges or the like become weakened due to exposure, consequently requiring condemning the structure until new beams having the desired strength can be installed and it is to overcome these objections that the present method has been devised.

It is a well known fact that metal beams used in structures not thoroughly protected against the weather or other damaging effects even though coated with various protective compositions, will in due time become weakened due to rust, corrosion or other ill effects and it is contemplated in this method to restore the beams thus weakened to their original strength and while in their original positions by the addition of reinforcing elements having at least the cubic capacity of metal equal to the metal lost or worn away.

It has been observed that beams used in the construction of viaducts or the like and which are exposed to fumes and cinders from locomotives passing thereunder are weakened in a comparatively short time due to the fact that the fumes and cinders have a disastrous effect upon the beams resulting in the weakening thereof to such an extent that replacement is necessary and the consequent loss of use of the construction.

Our method also contemplates the application of cement to the reinforced beam to encase the same, the cement being applied under pressure, whereby when so encased the beam as well as the added reinforcing elements will be thoroughly protected, thereby prolonging the life of beams so repaired indefinitely.

In the drawings:—

Figure 1 is a fragmentary side elevation of the beam previous to the application of cement.

Figure 2 is a sectional view on line 2—2 of Figure 1, the cement coating being shown in dotted outline.

Figure 3 is a sectional view on line 3—3 of Figure 1.

Figure 4 is a sectional view on line 4—4 of Figure 1.

Figure 5 is a fragmentary side elevation of the beam showing a slightly modified form of the invention, and previous to the application of cement thereto.

Figure 6 is a sectional view on line 6—6 of Figure 5, the cement coating being indicated in dotted outline.

Referring to the drawings 1 designates a conventional I-beam which has become weakened from use and it is in connection with such beams that our method is most effectively practiced and as before stated the beam is strengthened while in its original position. It will be of course understood that before the application of the reinforcing elements and cement that the beam is thoroughly scraped or sand blasted so that the surface thereof will be in proper condition for the application of the cement.

The lower flange of the beam is drilled adjacent the ends to provide holes 2 in which are welded or otherwise suitably fixed the upturned ends 3 of the rods 4, thus securing said rods with their bight portions disposed longitudinally beneath said flange.

The web 5 of the I-beam 1 has drilled near the upper end thereof openings 6 in which are engaged transversely disposed bars 7, which have their hooked ends 8 alternately arranged upon opposite sides of the web, said bars being of greater length than the width of the upper flange of the beam. A rod 9 is placed upon each side of the web 5 and may rest upon the bars 7 and may be secured thereto by ties 10.

In addition to the rods 9 the web is equipped upon opposite sides with rods 11, said rods having elbows 12 to produce angularly disposed extensions 13 which are welded in the openings 14 drilled in said web at points adjacent the lower flange of the beam 1. The bight portions of the rods 11 are disposed in the same plane and extend longitudinally of the associated flange.

To compensate for any endwise strain upon the rods 11 connecting bars 15 are employed and have their ends welded to the respective elbows 12 thereby firmly connecting said rods. The web 5 of the beam is provided at intervals with relatively large openings 16, the purpose of which will later appear. Disposed upon opposite sides of the web and adjacent the rods 9 and 11 are rods 17.

The beam 1 after being equipped with the respective rods is encased with the exception of the upper flange, with a screen 18 of comparatively large mesh and this screen is formed to take the general shape of the beam. This screen may be secured to the rods 4 and 17, if desired.

In the modified form of the invention as shown in Figures 5 and 6 the reinforcing rods are arranged in the same manner as those of the preferred form with the exception of the rods 19 used in lieu of the rods 11. These rods terminate in upwardly and outwardly inclined ends 20, which in turn terminate in laterally turned shanks 21 adapted to be welded in the openings 22 formed in the web 5, the bight portions of said rods being disposed in vertical spaced relation and near the lower flange of the I-beam 1. These rods are also connected by bars 23 which serve the same function as the bars 15 of the preferred form of the invention.

As before stated it is not necessary to remove the beam from its original place since it is only necessary to first ascertain approximately how many cubic inches of metal originally contained in the beam has been lost. After this has been determined the various reinforcing rods are applied in their proper positions, it being essential that the rods applied be at least equivalent to the amount of metal worn from the beam. In this manner the worn beam can be restored to its original strength and the cement can then be "shot" from the gun on the beam so as to incase the same, whereby the respective reinforcing rods, as well as the screen 18 will be embedded in the coating of cement 24, as clearly illustrated in Figures 2 and 6 of the drawings.

The cement when thus applied will not only add additional strength to the beam, but will also protect the same against deterioration from various causes.

We have not deemed it necessary to illustrate any particular arrangement of shooting strips since they may be arranged in any desired manner to effectively carry out our method. It is essential, however, that the shooting strips be so arranged that the upper flange of the beam be encased to a greater transverse area than the lower flange and owing to the presence of the bars 7 the coating around the upper flange will be effectively sustained.

In Figures 5 and 6 of the drawings are shown cross rods 25 which are welded in the web 5 and have their ends engaged with the rods 19, and serve to prevent upward movement thereof when under strain.

By providing the webs 5, in both forms of the invention with the openings 16 the cement coating when applied will fill the same and constitute bonds for uniting the cement upon opposite sides of said webs.

What is claimed is:—

1. The combination with a metal beam, of reinforcing rods disposed longitudinally thereof and having elbows and resultant extensions upon their ends, said extensions being secured to the beam, and bars connecting the elbows.

2. The combination with an I-beam, of reinforcing rods disposed longitudinally thereof, said rods having elbows and resultant extensions upon their ends, the extensions being secured to the web of the beam, bars connecting the elbows, rods extending beneath the lower flange of the beam and having upturned ends adapted to be secured in the lower flange of said beam, bars fixed transversely of the web and adjacent the upper flange thereof, said beam, rods and bars being encased in a coating of cement.

3. The combination with a metal I-beam, of rods disposed longitudinally thereof and in a plane beyond the edges of the upper flange of the beam, bars disposed transversely of the beam and adjacent the upper flange thereof, said bars being of a length greater than the width of the upper flange, said rods and bars being capable of sustaining a relatively thick coating of cement adjacent the said upper flange.

In testimony whereof we affix our signatures.

WILLIAM A. FRITZ.
CARL C. COOKE.